United States Patent [19]

Weber et al.

[11] Patent Number: 5,792,000
[45] Date of Patent: Aug. 11, 1998

[54] GOLF SWING ANALYSIS METHOD AND APPARATUS

[75] Inventors: Leo L. Weber, West Bloomfield; Henry C. Kowalski, Grand Blanc, both of Mich.

[73] Assignee: SCI Golf Inc., Brighton, Mich.

[21] Appl. No.: 686,468

[22] Filed: Jul. 25, 1996

[51] Int. Cl.$^6$ ................................................ A63B 69/36
[52] U.S. Cl. ........................................ 473/223; 473/409
[58] Field of Search ...................... 473/223, 224, 473/409

[56] References Cited

U.S. PATENT DOCUMENTS

| | | |
|---|---|---|
| 3,270,564 | 9/1966 | Evans .................... 473/223 X |
| 3,945,646 | 3/1976 | Hammond ................ 473/223 |
| 4,713,686 | 12/1987 | Ozaki et al. ............. 473/222 X |
| 5,342,054 | 8/1994 | Chang et al. ............ 473/222 |

*Primary Examiner*—George J. Marlo
*Attorney, Agent, or Firm*—Learman & McCulloch

[57] ABSTRACT

Analysis of a golfer's swing is effected by the golfer's swinging a club which has sensors fixed to the club shaft in such manner as to sense torsion of the shaft and flexing of the shaft in a direction corresponding to the direction of the swing pattern and perpendicular to the swing path. At selected times during the swing when the torsional and flexing forces are at predetermined values, a camera is activated to photograph the golfer in the position he or she occupies at the instant each photograph is taken. The golfer then is enabled to see the position of his or her head, shoulders, hips, legs, arms, and hands at the time of each photograph and an instructor is enabled to concentrate on instructional drills that will result in improving the golfer's swing.

31 Claims, 5 Drawing Sheets

GOLF SWING ANALYSIS METHOD AND APPARATUS

TECHNICAL FIELD

This invention relates to methods and devices for use in analyzing the dynamics of a person's golf swing for the purpose of improving the swing.

BACKGROUND OF THE INVENTION

Various techniques exist for teaching golf, including personal instruction by a golf professional, written instruction in the form of books and magazine articles, and, more recently, video instruction. Recent electronic advances have made possible different video systems, mechanical trainers, and club head analyzers to determine club head path and velocity. Weight distribution systems that analyze weight shift in combination with video systems also are available. There also exist image freeze systems that are used to compare a golfer's head, back, and arm positions with those of professionals.

It is well known that, when a golfer swings a golf club, the shaft will flex due to forces acting on the club head. Electronic sensors, such as strain gauges have been used by golf club manufacturers for measuring flexures of shafts formed from various materials, determining stress levels to prevent shaft overload, and determining optimal shaft stiffness.

Shaft flexing is due to a number of dynamic forces resulting from the swinging of a golf club. For example, in those instances in which the club shaft is fitted to the club head adjacent the heel, swinging of the club causes the toe of the head to droop due to centrifugal force, thereby imposing on the shaft a flexing force tending to arch the shaft in a plane perpendicular to the path of the club during the swing. The shaft also is arched longitudinally in the plane of the swing path due to the lag of the club head during the swing. In addition, swinging of the club causes the club head to impose a torsional force on the shaft.

All of these forces vary to some extent during the swinging of the club and the variations may be due to any one or more of a number of factors. For example, changes in acceleration will cause the longitudinal arching and twisting of the shaft to vary during a continuous swing. In addition, the forces imposed on a club shaft may vary depending on whether the path of the club head as it approaches a ball is what is known as inside out, outside in, or directly toward the target.

Currently available teaching systems generally relate to a person's body position, the club head path, swing speed, timing, and other attributes of a golfer's swing. However, what is needed is a system that can be used to identify and record significant events that occur at selected time periods during the course of the golf swing so as to enable the person to understand what occurs during the swing and undertake training to improve the swing.

SUMMARY OF THE INVENTION

A golf club which preferably is of the kind that can be used to play golf is fitted with a plurality of sensors which sense flexing of the club shaft in two mutually normal planes, one of which is perpendicular to the path of the club head and the other of which is in such path. The shaft also is fitted with sensors which sense torsion to which the shaft is subjected during the swing. The sensors are capable of generating signals in response to the bending and torsion forces to which the club shaft is subjected. Such signals are connected to an analysis apparatus which processes the signals and triggers the operation of the apparatus which records the significant forces imposed on the shaft at preselected times, thereby enabling a person's golf swing to be analyzed. The triggered apparatus may be a camera which receives the triggering impulse and photographs the golfer at or shortly after the triggering impulse is received. The triggered apparatus also could be a recorder that produces a graph in response to reception of the triggering impulses. In any case the signals produced by the forces imposed on the club shaft during any selected portion of the golf swing may be detected and displayed in a form which may be visualized, thereby enabling the golfer to understand what must be done to improve his swing.

THE DRAWINGS

A preferred embodiment of the invention is illustrated in the accompanying drawings wherein.

DESCRIPTION OF THE PREFERRED EMBODIMENT

Figure 1:
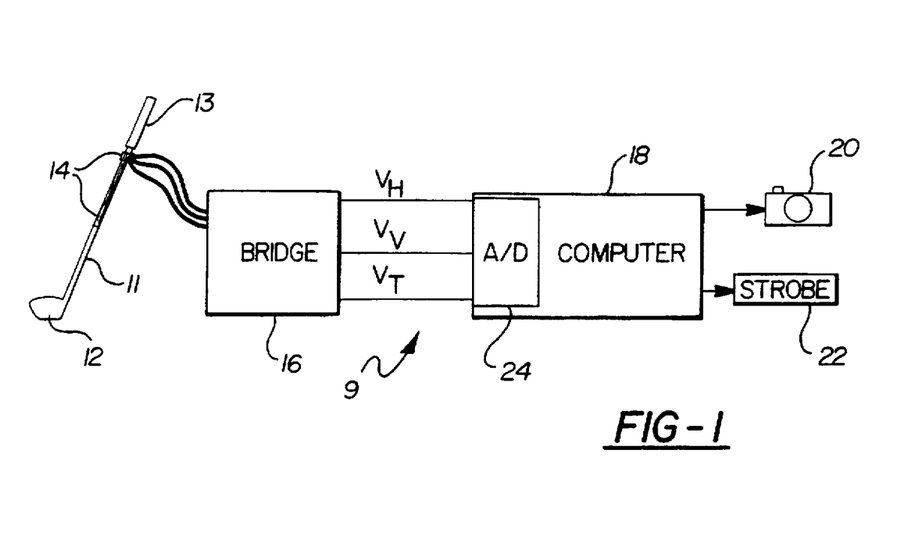
FIG. 1 is a block diagram of the golf swing analyzer.

A golf swing analyzer 9 according to the invention includes a golf club 10 having an elongate shaft 11 at one end of which is a club head 12 and at the opposite end of which is a grip 13. A plurality of sensors 14 capable of detecting flexing and torsional forces are fixed on the shaft 11 and wired together into a bridge circuit 16 that provides analog data signals to a computer 18 for processing and controlling a camera 20 and strobe 22. Sensors 14 are used to provide data to computer 18 indicative of the flexing (bending) and torsion (twisting) of the shaft 11 of golf club 10, as will be described in greater detail below. The magnitude of flexure along a pair of orthogonally-related axes is measured and represented by two analog voltage signals, $V_H$ and $V_V$. The magnitude of torsion of the shaft is measured and represented by a third analog voltage signal, $V_T$. These signals are delivered to and digitized by computer 18 using a conventional A/D converter 24. The resulting data then can be processed for various purposes, including providing a graphical or numerical printout or display of the data or controlling the operation of camera 20 and strobe 22 to photograph the golfer at one or more instants during the swing.

Figure 2:
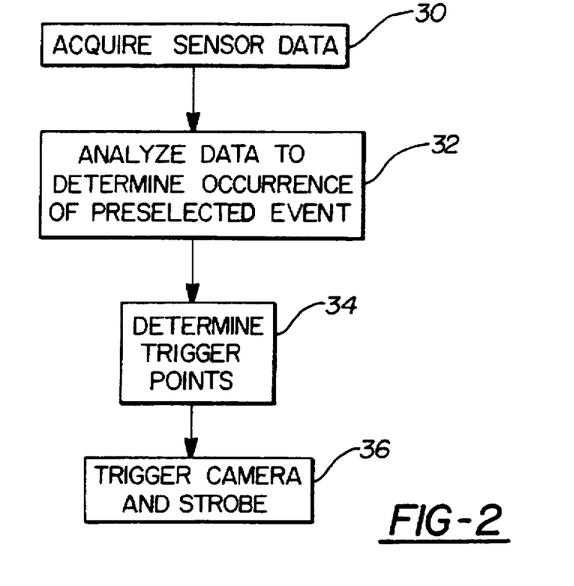
FIG. 2 depicts the analyzing methodology using the apparatus of FIG. 1.

One example of the use of the acquired data is illustrated in FIG. 2. In this example, the golf swing analyzer 9 is used to detect a preselected significant event that occurs during the course of a golf swing and to trigger the camera and strobe to photograph the golfer, either at the instant that event occurs or at a preselected later point in the swing. Thus, the first step is to use computer 18 to acquire the data generated by sensors 14 over the course of the golf swing, as indicated at block 30. That data then is analyzed by computer 18 which uses pre-programmed criteria to determine or select in real time a particular event that occurs during the course of the swing. This is indicated at block 32. Using this information, computer 18 determines one or more trigger points, as shown by block 34. Each trigger point can be concurrent with the particular event or delayed to anticipate a later event that is to be captured by the photograph. The camera and strobe are then activated at the trigger point to capture a photograph of the golfer at a specific point in the swing, as indicated at block 36.

Figures 3, 3A, 7:
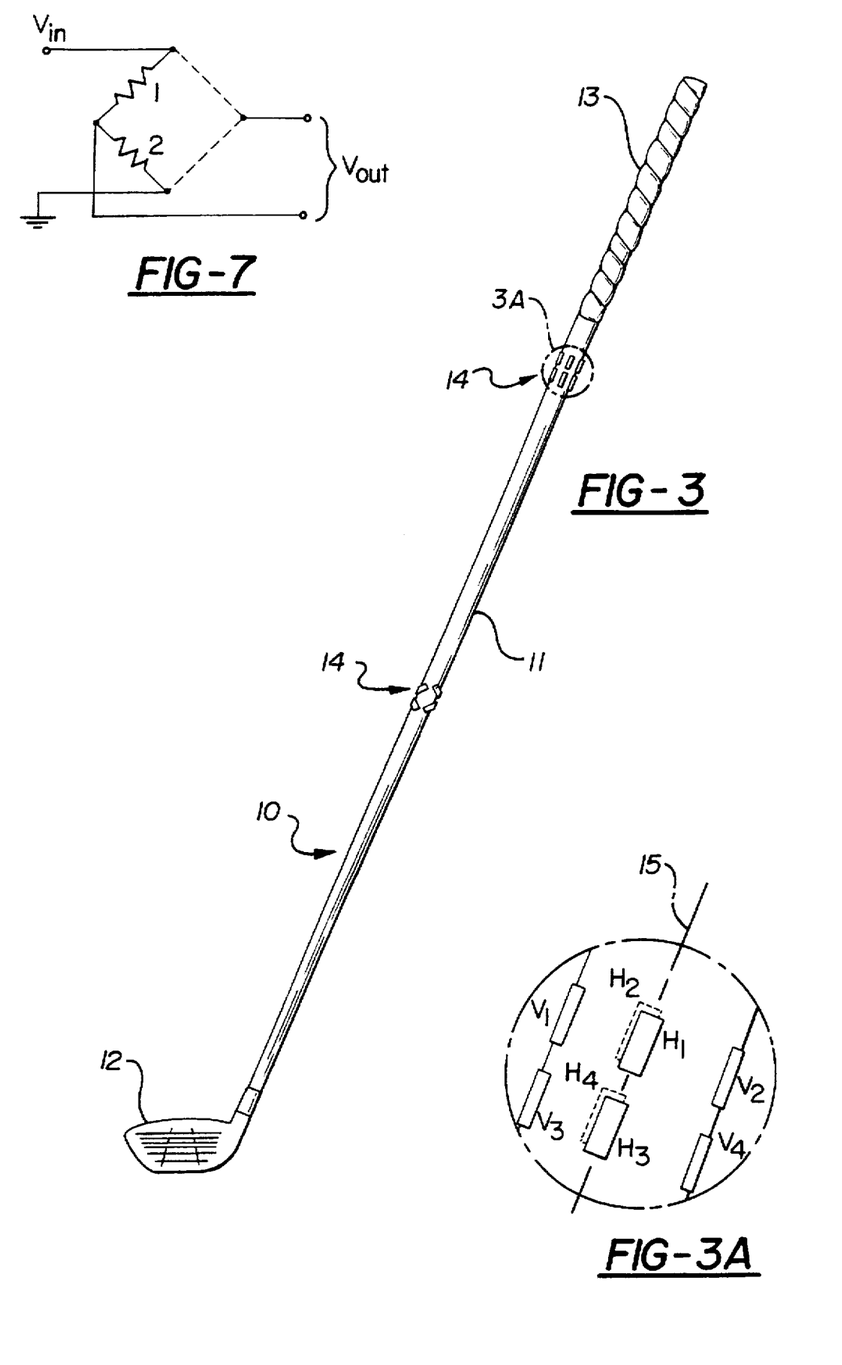
FIG. 3 is a side elevational view of a golf club used with the apparatus of FIG. 1 showing the placement of the sensors.
FIG. 3A is an enlarged, fragmentary, side elevational view of a section of the shaft of the golf club of FIG. 3 showing the placement and orientation of sensors for detecting flexing of the shaft in one direction transversely of the longitudinal axis thereof.
FIG. 7 is a schematic diagram of another embodiment of a bridge circuit which can be used with the apparatus of FIG. 1.
Figure 4:
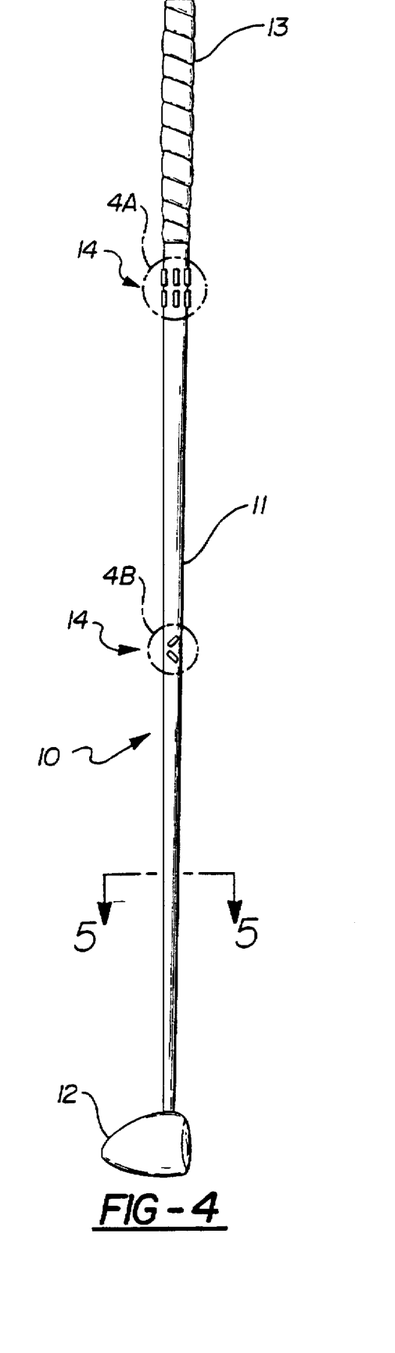
FIG. 4 is a front elevational view of the golf club of FIG. 3.
Figure 5:
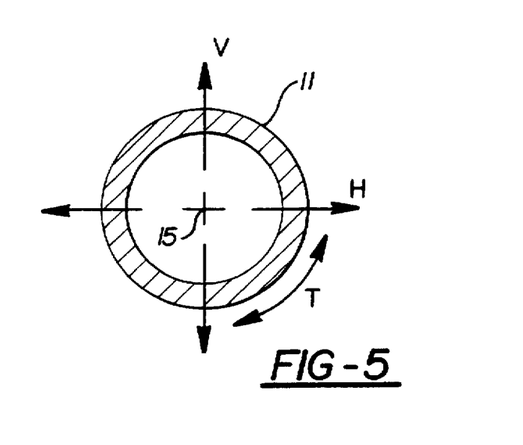
FIG. 5 is a cross-sectional view taken along the line 5—5 of FIG. 4 showing the various axes along which strain within the golf club shaft is measured.

The golf club 10 as shown in FIGS. 3 and 4 is fitted with three sets of sensors 14 fixed on the shaft 11 in such manner as to generate the $V_H$, $V_V$, and $V_T$ electrical signals. The first set of sensors includes two pairs of flexure sensors $H_1$, $H_2$, $H_3$, and $H_4$. The second set includes two pairs of flexure sensors $V_1$, $V_2$, $V_3$, and $V_4$ which are interspersed among the horizontal sensors. The third set of sensors includes two pairs of torsion sensors $T_1$, $T_2$, $T_3$, and $T_4$. The horizontal sensors are so-named because they measure flexure which occurs transversely of the longitudinal axis 15 of the shaft and lies along the path or plane along which the golf club travels during the golfer's swing. The vertical sensors are so named because they measure flexure which occurs transversely of the longitudinal axis 15 and perpendicular to the path of the swing, or 90° removed from the other transverse flexure. The torsion sensors are so named because they measure twisting of the shaft about its axis 15. In FIG. 5, therefore, the axis labeled H indicates the horizontal flexure, the axis labeled V indicates the vertical flexure, and the curve labeled T indicates the direction of torsion that is sensed.

The horizontal, vertical, and torsion sensors can all be strain gauges of known kind that have a resistance which varies with the amount of flexure undergone by the substrate or other surface to which they are attached. The sensors are attached to the surface of shaft 11 of golf club 10 using an adhesive that permits any flexure or torsion of shaft 11 to be transmitted to the sensors. Sensor designated ADXL05 manufactured by Analog Devices are suitable for use. Although strain gauges are described as constituting the sensors, it will be understood that accelerometers, variable resistors, and other suitable sensors can be used in lieu of strain gauges.

Figures 4A, 4B:
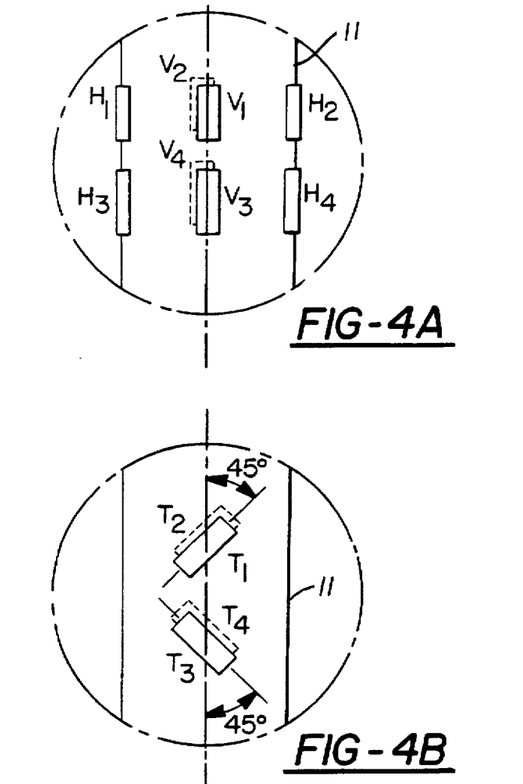
FIG. 4A is an enlarged, fragmentary, front elevational view of a section of the shaft of the golf club of FIG. 3 showing the placement and orientation of sensors for detecting flexing of the shaft in a second direction transversely of the longitudinal axis thereof.
FIG. 4B is an enlarged, fragmentary, front elevational view of another section of the shaft of the golf club of FIG. 3 showing the placement and orientation of torsion detecting sensors.

For the horizontal and vertical sensors, the circumferential position and orientation of each sensor is selected so that the sensor responds only to strain along its associated axis. As shown in FIGS. 3A and 4A, the pairs of horizontal sensors are mounted at diametrally opposed locations along the horizontal axis H shown in FIG. 5. These sensors are oriented so that they extend axially along shaft 11. The sensors of one pair (sensors $H_1$ and $H_3$) are spaced 180° apart about the circumference of shaft 11 from the sensors of the other pair (sensors $H_2$ and $H_4$). In this way, flexure of shaft 11 along the plane of the swing path will cause one pair of horizontal sensors to be subjected to compression forces and the other pair to be subjected to tension forces. As will be described below, the resulting changes in resistance of the horizontal sensors are used to generate the analog voltage $V_H$.

As also is shown in FIGS. 3A and 4A, the pairs of vertical sensors are mounted at diametrally opposed locations along the vertical axis V depicted in FIG. 5. Thus, these vertical sensors are spaced 90° from the horizontal sensors. The vertical sensors are oriented so that they extend axially along shaft 11. As with the horizontal sensors, one pair of vertical sensors, $V_1$ and $V_3$, is spaced 180° about the circumference of shaft 11 from the other pair vertical sensors, $V_2$ and $V_4$. As a result, flexure of shaft 11 in a direction normal to the swing path will cause one pair of vertical sensors to be subjected to compression forces and the other to tension forces, thereby resulting in changes in resistance of the sensors that are used to generate the analog voltage $V_V$.

As shown in FIG. 4B, the torsion sensors $T_1$-$T_4$ are oriented at a 45° angle with respect to longitudinal axis 15 of the golf club. The sensors of one pair of sensors, $T_2$ and $T_4$, are at the same axial position on the shaft and the sensors $T_1$ and $T_3$ of the other pair are diametrally opposed to the first pair. The sensors of each pair are oriented at a 90° angle with respect to each other; sensor $T_1$ has the same orientation as sensor $T_2$, while sensor $T_3$ has the same orientation as sensor $T_4$.

Figure 6:
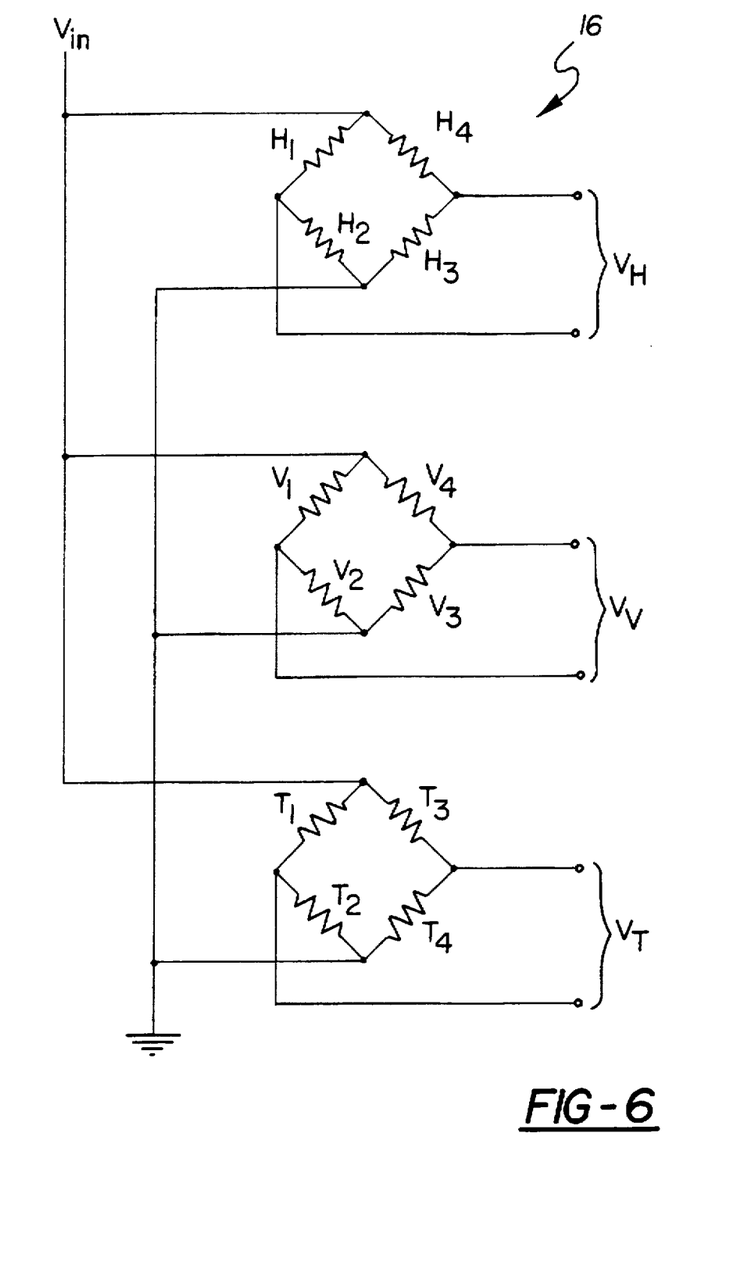
FIG. 6 is a schematic diagram of a full-bridge circuit used in the apparatus of FIG. 1 to generate $V_H$, $V_V$, and $V_T$ signals for transmission to and processing by the computer of FIG. 1.

The effect of orientation of the torsion sensors can be understood by inspection of the bridge circuit 16 shown in FIG. 6. Circuit 16 actually comprises three full bridges, one for each set of sensors. The torsion bridge utilizes sensors $T_1$ and $T_2$ to form one voltage divider extending between a supply voltage and common ground. Sensors $T_3$ and $T_4$ form a second voltage divider connected in parallel with the first. The analog voltage $V_T$ is the differential voltage between the center points of the two voltage dividers. As will be understood by inspection of FIGS. 4B and 6, flexure of shaft 11 along the plane of the swing path (i.e., along the horizontal axis) will have the same effect on all four torsion sensors; all will be in compression or all will be in tension. Thus, the ratio of resistance value of sensor $T_1$ to sensor $T_2$ will be the same as that of sensor $T_3$ to sensor $T_4$ and voltage $V_T$ will therefore be zero. Flexure of shaft 11 in the vertical direction will result in the resistance of sensors $T_1$ and $T_3$ changing an equal amount and also will result in the resistance of sensors $T_2$ and $T_4$ changing an equal amount. Thus, voltage $V_T$ will remain unchanged by this type of flexure. Accordingly, given the orientation of the torsion sensors and their connection in the full bridge shown in FIG. 6, flexure of shaft 11 in any direction will have no effect on voltage $V_T$. Rather, voltage $V_T$ will have a magnitude (positive or negative) only in the event of twisting of shaft 11, since torsion will place sensors $T_1$ and $T_4$ in the same state as each other (either tension or compression) and will place sensors $T_2$ and $T_3$ in the other state. For the horizontal and vertical sensors, the connection of those sensors in full bridges is done in a manner similar to that used for the torsion sensors, except that the positions in the bridges of sensors $H_3$ and $H_4$, as well as sensors $V_3$ and $V_4$, must be switched.

With continued reference to FIG. 6, it will be understood that the wiring of sensors 14 in the bridge circuits can be done on the shaft 11 of the golf club itself. The only external connections necessary are those required to supply the input voltage $V_{in}$ and to conduct the output voltages $V_H$, $V_V$, and $V_T$. These connections can be hardwired as shown in FIG. 1 or, if the golf club is fitted with a battery or other source of power, then wireless transmission of the output voltages can be achieved.

In addition to placing the sensors in a preselected axial orientation and circumferential position, it is desirable to determine the optimum location along the length of shaft 11 for placement of each set of sensors. Because the shaft of a conventional golf club does not have a uniform diameter and wall thickness along its length, the amount of bending of the shaft during a swing will vary between the grip and club head. Since the magnitude of the signal provided by the horizontal and vertical sensors is a function of the degree of bending of the shaft during the swing, the magnitude of the signals provided by these sensors can be maximized by locating the sensors at the point along the length of the shaft that undergoes maximum bending during the swing.

This ideal placement can be determined by finding the location L along the length of the shaft at which the result of equation (1) is maximized:

$$\epsilon \cdot K = \frac{r_o \cdot L}{r_o^4 - r_i^4} \qquad (1)$$

where:

$r_o$ equals the outside diameter of the shaft;

$r_i$ equals the inside diameter of the shaft; and

K equals a constant.

Similarly, the ideal placement of the torsion sensors is that position along the length of the shaft at which the maximum amount of twisting occurs. That position can be determined by finding the location along the length of the shaft at which the result of equation (2) is maximized:

$$\gamma \cdot K = \frac{r_o}{r_o^4 - r_i^4}, \qquad (2)$$

It should be noted that, if necessary or desired, the sensors can be located at other positions along the length of the shaft, the only requirement being that the selected location is such that the sensors will provide a signal of sufficient magnitude that the desired trigger points can be determined.

Although the illustrated embodiment shows four sensors being used for the measurements of strain in different directions, it will be understood that more or fewer sensors could be used. For example, two sensors could be used and connected into a half bridge circuit, as shown in FIG. 7. However, this arrangement is not preferred since the magnitude of the resulting analog output signal will be only half of that generated by the full bridge circuits of FIG. 6.

The operation of camera 20 and strobe 22 shown in FIG. 1 can be implemented in a variety of ways. If there is low ambient light, the camera shutter can be opened prior to the trigger point and the strobe can be used to provide instantaneous illumination at the trigger point. The camera shutter can thereafter be closed. Alternatively, camera 20 can have its own flash or can be wired to strobe 22 or some other flash so that the flash is activated by virtue of the camera's being activated, rather than by a separate output from computer 18. Camera 20 can be a standard film camera or a digital camera, in which case the digital image data conveniently can be stored and later recalled for display, printing, or other use. If multiple trigger points are desired, several cameras can be used or a high speed digital or film camera can be used to capture two or more events during the course of a single golf swing. Preferably, the trigger points are recorded and stored along with the acquired sensor data so that the photographed image can be correlated with the sensor data.

Figure 8A:
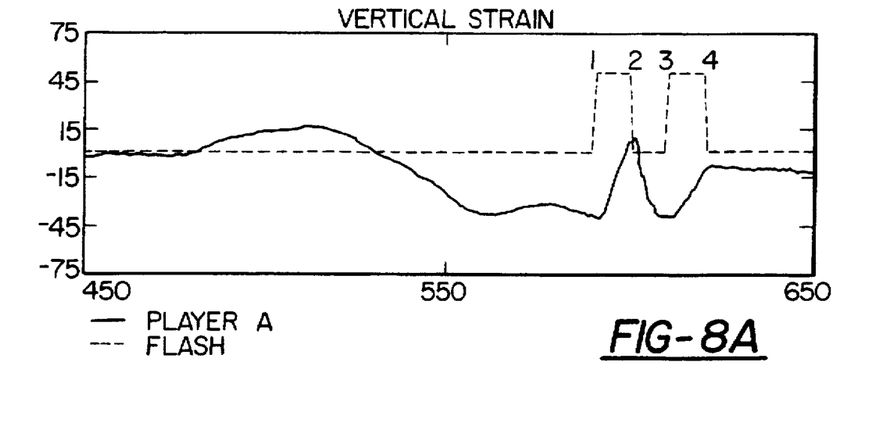
FIG. 8 depicts exemplary graphs of the data acquired by the computer from the sensors on the golf club shaft.
Figure 8B:
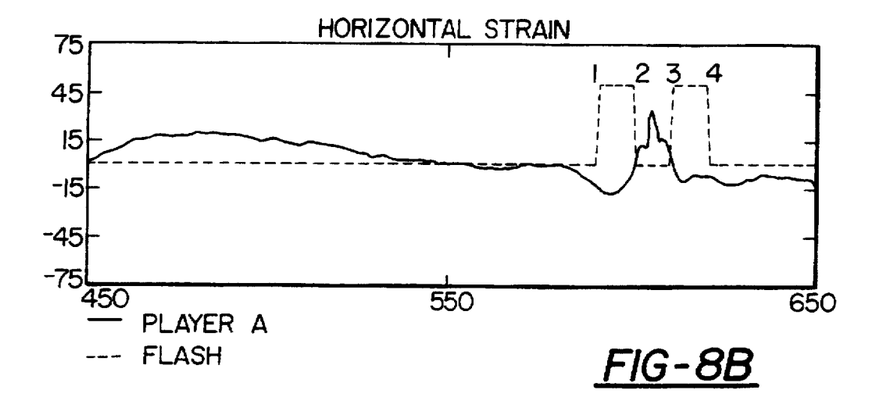
Figure 8C:
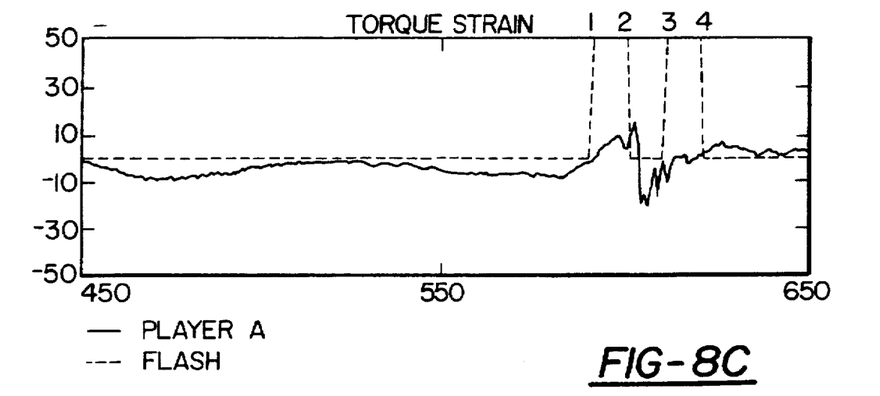

As mentioned above, computer 18 analyzes the acquired sensor data to locate a particular event and then activates the camera and strobe to photograph the golfer's position either at that instant of time or at a later time during the swing. FIG. 8 shows three graphs illustrating exemplary strain profiles in the vertical, horizontal, and torsion directions. In this example, four photographs are taken during the time of the swing, as indicated by numbers 1–4. The first of these corresponds roughly to the early part of the swing when the golfer's arms are in the nine o'clock position. This point can be determined by computer 18 by analyzing the vertical strain ($V_V$) and triggering when that signal reaches a negative peak. The second point is at the time of impact between the club head and ball and this point can be determined by monitoring the horizontal strain ($V_H$) for a zero crossing in the positive direction. The third point is after impact and corresponds roughly to the golfer's arms being in the three o'clock position. This point can be triggered by waiting 70 ms after impact. The fourth point is the finish of the swing and can be determined by monitoring one or more of the analog signals to determine when it returns to zero or plateaus near zero.

Computer processing of the sensor data can include operations other than determination or selection of particular events and trigger points. For example, the received sensor data can be filtered to smooth the signal or analyzed to determine the appropriate type of club construction (e.g., metal or graphite shaft) or swing weight for the golfer.

The golf swing analyzer of FIG. 1 can include additional sensors that provide an output which can be processed by the computer to determine a desired trigger point. For example, strain gauges, load cells, or other suitable sensors could be located beneath the golfer's feet and used by the computer to measure weight shift.

This disclosure is representative of the presently preferred embodiment of the invention, but is intended to be illustrative rather than definitive thereof. The invention is defined in the claims.

We claim:

1. Apparatus for use in analyzing a golfer's swing of a golf club along a path, said golf club comprising an elongate shaft having a longitudinal axis and terminating at one end in a club head and at its other end in a grip, said apparatus comprising first sensor means mounted on said shaft between the ends thereof in a position to sense first flexing of said shaft in the direction of said path and generate a first electrical signal in response to such flexing; second sensor means mounted on said shaft between the ends thereof in a position to sense second flexing of said shaft in a direction transversely of said path and generate a second electrical signal in response to said second flexing; third sensor means mounted on said shaft between the ends thereof in a position to sense torsion of said shaft and generate a third electrical signal in response to torsion of said shaft; and analysis apparatus operable to process at least one of said first, second, and third signals and generate a trigger signal in response to said processing, said analysis apparatus including a device separate from said sensor means operable in response to said trigger signal to detect and record data concerning the golfer's swing.

2. Apparatus according to claim 1 wherein each of said first, second, and third sensor means is separate from one another.

3. Apparatus according to claim 1 wherein said first sensor means comprises at least one pair of electrical sensors mounted on said shaft at the same axial position.

4. Apparatus according to claim 1 wherein said second sensor means comprises at least one pair of electrical sensors mounted on said shaft in diametrally opposed positions.

5. Apparatus according to claim 1 wherein said third sensor means comprises at least one pair of electrical sensors mounted on said shaft at the same axial position.

6. Apparatus according to claim 1 wherein said first sensor means comprises two pairs of electrical sensors, the sensors of each pair of said sensors being diametrally opposed to one another.

7. Apparatus according to claim 1 wherein said second sensor means comprises two pairs of electrical sensors, the sensors of each pair of said sensors being diametrally opposed to one another.

8. Apparatus according to claim 1 wherein said third sensor means comprises two pairs of electrical sensors, the sensors of each pair of said sensors being diametrally opposed to the sensors of the other pair of said sensors.

9. Apparatus according to claim 1 wherein said first sensor means comprises a first pair of electrical sensors secured to said shaft in such manner that flexing of said shaft in the direction of said path causes one of said sensors to be subjected to compression force and the other of said sensors to be subjected to tensile force.

10. Apparatus according to claim 1 wherein said second sensor means comprises a first pair of electrical sensors secured to said shaft in such manner that flexing of said shaft in a direction transversely of said path causes one of said sensors to be subjected to compression force and the other of said sensors to be subjected to tensile force.

11. Apparatus according to claim 1 wherein said third sensor means comprises at least two electrical sensors secured to said shaft in such manner that twisting of said shaft in one direction places one of said sensors in compression and the other of said sensors in tension, and flexing of said shaft places both of said sensors in either compression or tension.

12. Apparatus according to claim 11 wherein said third sensor means comprises a pair of strain gauges secured to such shaft at the same axial position, each said strain gauge being inclined at an angle of about 45° to said longitudinal axis of said shaft and at an angle of about 90° relative to each other.

13. Apparatus according to claim 11, wherein said third sensor means comprises two pairs of strain gauges, the gauges of one of said pairs being secured to said shaft at diametrally opposed positions from the gauges of the other of said pairs, the gauges of each pair being oriented at an angle of about 90° with respect to each other and being inclined at an angle of about 45° to the longitudinal axis of said shaft.

14. Apparatus according to claim 13 wherein one of said pairs of strain gauges includes a first and a third gauge and the other of said pairs includes a second and a fourth gauge, said first and second gauges being connected in series to form a first voltage divider, said third and fourth gauges being connected in series to form a second voltage divider, and said voltage dividers being connected in parallel to form a bridge circuit.

15. Apparatus according to claim 11 wherein said two electrical sensors are connected in series to form a voltage divider and wherein the series connection of said sensors comprises an output of said third sensor means.

16. Apparatus according to claim 1, wherein said first sensor means comprises first and second pairs of strain gauges secured to said shaft at diametrally opposed positions, the gauges of each of said pairs being substantially parallel to said longitudinal axis of said shaft and being spaced axially along said shaft from each other.

17. Apparatus according to claim 1 wherein said analysis apparatus includes a microprocessor operable under program control to detect the occurrence of an event using at least one of said first, second, and third signals and generate said trigger signal in response to detecting the occurrence of said event.

18. Apparatus according to claim 1 wherein at least one of said sensor means comprises a pair of electrical sensors mounted on said shaft in diametrally opposed positions, said pair of electrical sensors being connected in series to form a voltage divider, and the series connection of said sensors comprises an output of said one of said sensor means.

19. Apparatus according to claim 1 wherein said shaft comprises a tube having an inside diameter and an outside diameter at least one of which varies longitudinally of said shaft, said first and second sensor means being located along said shaft at a selected position relative to said inside and outside diameters.

20. Apparatus for use in analyzing a golfer's swing of a golf club along a path, said golf club comprising an elongate shaft having a longitudinal axis and terminating at one end in a club head and at its other end in a grip, said apparatus comprising at least two electrical sensors secured to said shaft in such manner that twisting of said shaft in one direction places one of said sensors in compression and the other of said sensors in tension, while flexing of said shaft places both of said sensors in either compression or tension.

21. Apparatus according to claim 20 wherein said electrical sensors comprise a pair of strain gauges secured to said shaft at corresponding axial positions, each of said strain gauges being inclined at an angle of about 45° to said longitudinal axis of said shaft and at an angle of about 90° relative to the other of said strain gauges.

22. Apparatus according to claim 20 wherein said apparatus comprises two pairs of strain gauges, the gauges of one of said pairs being secured to said shaft at diametrically opposed positions from the gauges of the other of said pairs, the gauges of each pair being oriented at an angle of about 90° with respect to each other and being inclined at an angle of about 45° to the longitudinal axis of said shaft, one of said pairs of gauges including a first and a third gauge and the other of said pairs including a second and a fourth gauge, said first and second gauges being connected in series to form a first voltage divider, said third and fourth gauges being connected in series to form a second voltage divider, and said voltage dividers being connected in parallel to form a bridge circuit.

23. Apparatus according to claim 20 wherein said shaft comprises a tube having an inside diameter and an outside diameter, at least one of which varies longitudinally of said shaft, said electrical sensors being located along said shaft at a selected position relative to said inside and outside diameters.

24. Apparatus according to claim 20 wherein said electrical sensors are located along said shaft at a position for which the term $$\frac{r_o}{r_o^4 - r_i^4}$$

is maximized where:

$r_o$=the outside diameter of the shaft, and $r_i$=the inside diameter of the shaft.

25. A method of analyzing a golfer's swing of a golf club having a sensor capable of measuring a force acting on said golf club during the golfer's swing of said golf club along a path, said method comprising the steps of:

providing a recording device oriented relative to the path to sense and record data relating to the golfer's swing;

measuring at least one force acting on said golf club during the golfer's swing using said sensor;

detecting the occurrence of a preselected event using said measured force;

determining at least one trigger point on said preselected event; and triggering said recording device at said trigger point to acquire instantaneous data relating to the golfer's swing at least at one position of said golf club along said path.

26. The method according to claim 25 wherein the measuring step comprises measuring the torsion of said shaft during the golfer's swing.

27. The method according to claim 25 wherein the measuring step comprises measuring flexing of said shaft during the golfer's swing.

28. The method according to claim 25 further recording said measured force at least at said one trigger point.

29. The method according to claim 25 wherein said recording device comprises a film camera.

30. The method according to claim 25 wherein said recording device further comprises a strobe and wherein said triggering step further comprises triggering said strobe at said one trigger point.

31. The method according to claim 25 wherein said recording device comprises a digital camera.

* * * * *

UNITED STATES PATENT AND TRADEMARK OFFICE
CERTIFICATE OF CORRECTION

PATENT NO.   : 5,792,000
DATED        : August 11, 1998
INVENTOR(S)  : Leo L. Weber and Henry C. Kowalski It is certified that error appears in the above-indentified patent and that said Letters Patent is hereby corrected as shown below:

Column 7, line 3, change "at the same axial position"

to -- in diametrally opposed positions --.

Signed and Sealed this

First Day of December, 1998

Attest:

BRUCE LEHMAN

Attesting Officer

Commissioner of Patents and Trademarks